United States Patent
Lo

(10) Patent No.: US 9,344,185 B2
(45) Date of Patent: May 17, 2016

(54) SYSTEM AND METHOD FOR SECURE PAIRING OF BLUETOOTH DEVICES

(71) Applicant: Chi Wah Lo, Hong Kong (HK)

(72) Inventor: Chi Wah Lo, Hong Kong (HK)

(73) Assignee: BBPOS LIMITED, Hong Kong (HK)

( * ) Notice: Subject to any disclaimer, the term of this patent is extended or adjusted under 35 U.S.C. 154(b) by 40 days.

(21) Appl. No.: 14/222,756

(22) Filed: Mar. 24, 2014

(65) Prior Publication Data

US 2014/0295761 A1    Oct. 2, 2014

Related U.S. Application Data

(60) Provisional application No. 61/805,538, filed on Mar. 27, 2013.

(51) Int. Cl.
| | | |
|---|---|---|
| *H04B 7/00* | (2006.01) | |
| *H04B 7/26* | (2006.01) | |
| *H04W 12/04* | (2009.01) | |
| *H04B 5/00* | (2006.01) | |
| *H04M 1/66* | (2006.01) | |
| *H04M 1/68* | (2006.01) | |
| *H04M 3/16* | (2006.01) | |
| *H04W 8/00* | (2009.01) | |
| *H04L 29/06* | (2006.01) | |
| *H04W 12/06* | (2009.01) | |
| *H04W 84/18* | (2009.01) | |

(52) U.S. Cl.
CPC ................. *H04B 7/26* (2013.01); *H04W 12/04* (2013.01); *H04L 63/18* (2013.01); *H04W 8/005* (2013.01); *H04W 12/06* (2013.01); *H04W 84/18* (2013.01)

(58) Field of Classification Search
CPC ...... H04W 4/008; H04W 12/06; H04L 63/18; H04M 1/7253
USPC .............................. 455/41.1, 41.2, 41.3, 411
See application file for complete search history.

(56) References Cited

U.S. PATENT DOCUMENTS

| | | | |
|---|---|---|---|
| 2005/0114714 A1* | 5/2005 | Albulet | G06F 1/3203 713/300 |
| 2006/0251256 A1* | 11/2006 | Asokan et al. | 380/270 |
| 2008/0268776 A1* | 10/2008 | Amendola | 455/41.2 |
| 2012/0309289 A1* | 12/2012 | Walsh et al. | 455/3.06 |

OTHER PUBLICATIONS

International Search Report and Written Opinion of the International Searching Authority from PCT/CN2014/074156, dated Jul. 9, 2014 (related application).

* cited by examiner

*Primary Examiner* — Ayodeji Ayotunde
(74) *Attorney, Agent, or Firm* — Howlson & Arnott, LLP

(57) ABSTRACT

A system of securely paired Bluetooth devices includes a host device and a peripheral device, where each device includes an audio interface and a Bluetooth transceiver. The host device and the peripheral device connect to each other by physically connecting their corresponding audio interfaces and communicate with each other by establishing an out-of-band audio communication channel via the connected audio interfaces. The host device and the peripheral device exchange Bluetooth authentication data via the out-of-band audio communication channel, and then are securely paired with each other by turning on and initializing the corresponding Bluetooth transceivers with the corresponding exchanged Bluetooth authentication data.

20 Claims, 2 Drawing Sheets

```
┌─────────────────────────────────────────────────────────┐
│ HOST DEVICE AND PERIPHERAL DEVICE ARE IN AN UNPAIRED    │
│ STATE; BLUETOOTH TRANSCEIVERS ARE TURNED OFF    201     │
└─────────────────────────────────────────────────────────┘
                            │
                            ▼
┌─────────────────────────────────────────────────────────┐
│   PERIPHERAL DEVICE IS PLUGGED INTO THE HOST DEVICE     │
│        THROUGH THE AUDIO INTERFACE    202               │
└─────────────────────────────────────────────────────────┘
                            │
                            ▼
┌─────────────────────────────────────────────────────────┐
│      HOST DEVICE DETECTS THE PRESENCE OF                │
│          THE PERIPHERAL DEVICE   203                    │
└─────────────────────────────────────────────────────────┘
                            │
                            ▼
┌─────────────────────────────────────────────────────────┐
│  PERIPHERAL DEVICE TURNS ON EITHER BY DETECTING         │
│  THE HOST DEVICE BY ITSELF OR AFTER RECEIVING           │
│    A COMMAND FROM THE HOST DEVICE 204                   │
└─────────────────────────────────────────────────────────┘
                            │
                            ▼
┌─────────────────────────────────────────────────────────┐
│  AUTHENTICATION CODE AND OTHER SIDE INFROMATION         │
│  FOR BLUETOOTH PAIRING OF THE PERIPHERAL DEVICE         │
│    AND THE HOST DEVICE IS EXCHANGED THROUGH             │
│           THE AUDIO CHANNEL    205                      │
└─────────────────────────────────────────────────────────┘
                            │
                            ▼
┌─────────────────────────────────────────────────────────┐
│  BLUETOOTH TRANCEIVERS OF BOTH THE HOST DEVICE          │
│  AND THE PERIPHERAL DEVICE ARE TURNED ON    206         │
└─────────────────────────────────────────────────────────┘
                            │
                            ▼
┌─────────────────────────────────────────────────────────┐
│   BLUETOOTH PAIRING OF THE PERIPHERAL DEVICE            │
│      AND THE HOST DEVICE IS DONE BY USING               │
│    THE EXCHANGED AUTHENTICATION CODE   207              │
└─────────────────────────────────────────────────────────┘
                            │
                            ▼
┌─────────────────────────────────────────────────────────┐
│ BLUETOOTH CONNECTION BETWEEN THE PERIPHERAL DEVICE      │
│    AND THE HOST DEVICE IS ESTABLISHED AND               │
│    IS READY FOR DATA COMMUNICATION   208                │
└─────────────────────────────────────────────────────────┘
```

*FIG. 2*

SYSTEM AND METHOD FOR SECURE PAIRING OF BLUETOOTH DEVICES

CROSS REFERENCE TO RELATED CO-PENDING APPLICATIONS

This application claims the benefit of U.S. provisional application Ser. No. 61/805,538 filed on Mar. 27, 2013 and entitled SYSTEM AND METHOD FOR SECURE PAIRING OF BLUETOOTH DEVICES, which is commonly assigned, and the contents of which are expressly incorporated herein by reference.

FIELD OF THE INVENTION

The present invention relates to a system and a method for secure pairing of Bluetooth devices using an out-of-band (OOB) audio channel.

BACKGROUND OF THE INVENTION

Portable personal computing devices such as Smartphones, Personal Digital Assistants (PDAs), portable computers, tablet computers and audio devices such as digital music players have become ubiquitous in recent years. These devices usually have different built-in physical electrical interfaces such as USB, FireWire, RS232 serial port and audio plug, among others. In almost all of these devices, and in particular in the audio devices, the audio plug is a common interface. The audio plug of a device acts as a receptacle for an audio jack connector which is used for transmitting analog signals including audio signals. The audio plug is used to connect to headphones, speakers, microphones, and hands-free devices, among others.

In the past, many mobile phones used to have their own proprietary form of audio plugs configured to be used with cables outfitted with matching proprietary audio jacks. However, recently the functionality of mobile phones has changed so much that most mobile phones are now also digital music players, payment devices, navigation devices and cameras, among others. Additional accessory devices including headphones, printers, and card readers, among others, may be connected to the mobile phones in order listen to music, print and complete payments, among others. Therefore, due to these added functionalities and the need to connect additional accessory devices to mobile phones, 2.5 mm audio plugs and/or 3.5 mm audio plugs can now be found on most middle to high-end mobile phones.

Besides wired connections, many portable devices are equipped with wireless connection capabilities such as Bluetooth, Wi-Fi or WiMAX, among others. In a wired connection where the devices are physically connected, the data security is less of a concern. Unlike wired connections, eavesdropping is possible in wireless connections and the data must be cryptographically protected and the two communicating devices must be authenticated with one another. A pairing process is necessary to establish this secure connection.

Bluetooth is a proprietary low-powered wireless technology for short-distance communication. The characteristics of Bluetooth make it a competitive candidate for data communication technology between a host device and other peripheral devices. Before the two devices can communicate, a pairing process has to be done first to establish a secure connection between the two Bluetooth devices. In the pairing process, the devices exchange and establish their common link keys used for the secure connection. The link keys are stored and further connections can be done without user interaction.

The number of devices equipped both with an audio plug interface and Bluetooth technology is expected to increase rapidly. The audio interface can be used for data transfer but the data rate is limited. Bluetooth can support a higher data rate but it is preferable to keep the Bluetooth transceiver off to save power and reduce radiation. Accordingly, there is a need for a simple and efficient way to enable wireless device pairing where control side information is communicated through an alternative channel.

SUMMARY OF THE INVENTION

The invention provides a secure and convenient way to pair Bluetooth devices using an out-of-band (OOB) audio channel.

In general, in one aspect, the invention provides a system of securely paired Bluetooth devices including a host device and a peripheral device. The host device includes an audio interface and a Bluetooth transceiver and the peripheral device includes an audio interface and a Bluetooth transceiver. The host device and the peripheral device are configured to connect to each other by physically connecting their corresponding audio interfaces and to communicate with each other by establishing an out-of-band audio communication channel via the connected audio interfaces. The host device and the peripheral device are configured to exchange Bluetooth authentication data via the out-of-band audio communication channel. The host device and the peripheral device are configured to be subsequently securely paired with each other by establishing an authenticated and cryptographically protected in-band Bluetooth communication channel with each other by turning on and initializing the corresponding Bluetooth transceivers with the corresponding exchanged Bluetooth authentication data.

Implementations of this aspect of the invention may include one or more of the following features. The in-band Bluetooth communication channel between the host device and the peripheral device is established automatically upon detection of the presence of the host device by the peripheral device and vice versa. The Bluetooth authentication data may be authentication code, PIN code, "Bluetooth Device Address", "Simple Pairing Hash C" or "Simple Pairing Randomizer R". Communications between the host device and the peripheral device via the out-of-band audio communication channel are two-way communications and use modulations including Manchester coding, Frequency Shifted Keying (FSK), or Phase-Shifted Keying (PSK). The turning on or off of the Bluetooth transceivers is controlled through the out-of-band audio communication channel to reduce power consumption and radiation by the Bluetooth transceivers. The host device is paired with the peripheral device using Bluetooth pairing protocols including Legacy Pairing, Secure Simple Pairing (SSP), or Out-of-Band (OOB) Pairing. The host and peripheral devices comprise computing devices and the computing devices include desktop computers, mobile phones, personal digital assistants (PDAs), netbooks, tablet computers, notebook computers, electronic readers, digital music players, digital video players, game consoles, or computing circuits. The peripheral device is initially in a sleep mode and the host device is configured to wake up the peripheral device by sending a command via the out-of-band audio communication channel. The command includes frequency tone or data packet. The peripheral device is initially in a sleep mode and is configured to wake itself up by detecting the presence of the host device.

In general, in another aspect, the invention provides a method for securely pairing Bluetooth devices including the following steps. First, providing a host device comprising an audio interface and a Bluetooth transceiver. Next, providing a peripheral device comprising an audio interface and a Bluetooth transceiver. Next, connecting the host device and the peripheral device to each other by physically connecting their corresponding audio interfaces. Next, communicating between the host device and the peripheral device by establishing an out-of-band audio communication channel via the connected audio interfaces. Next, exchanging Bluetooth authentication data between the host device and the peripheral device via the out-of-band audio communication channel. Finally, pairing the host device and the peripheral device with each other by establishing an authenticated and cryptographically protected in-band Bluetooth communication channel with each other. The in-band Bluetooth communication channel is established by turning on and initializing the corresponding Bluetooth transceivers with the corresponding exchanged Bluetooth authentication data.

Among the advantages of this invention may be one or more of the following. The system provides a simple and efficient way to enable wireless device pairing where control side information is communicated through an out-of-band audio channel.

The details of one or more embodiments of the invention are set forth in the accompanying drawings and description below. Other features, objects and advantages of the invention will be apparent from the following description of the preferred embodiments, the drawings and from the claims.

BRIEF DESCRIPTION OF THE DRAWINGS

FIG. 2 shows an exemplary operation flow of the Bluetooth pairing process with authentication information exchanged through the audio interface.

DETAILED DESCRIPTION OF THE INVENTION

Figure 1:
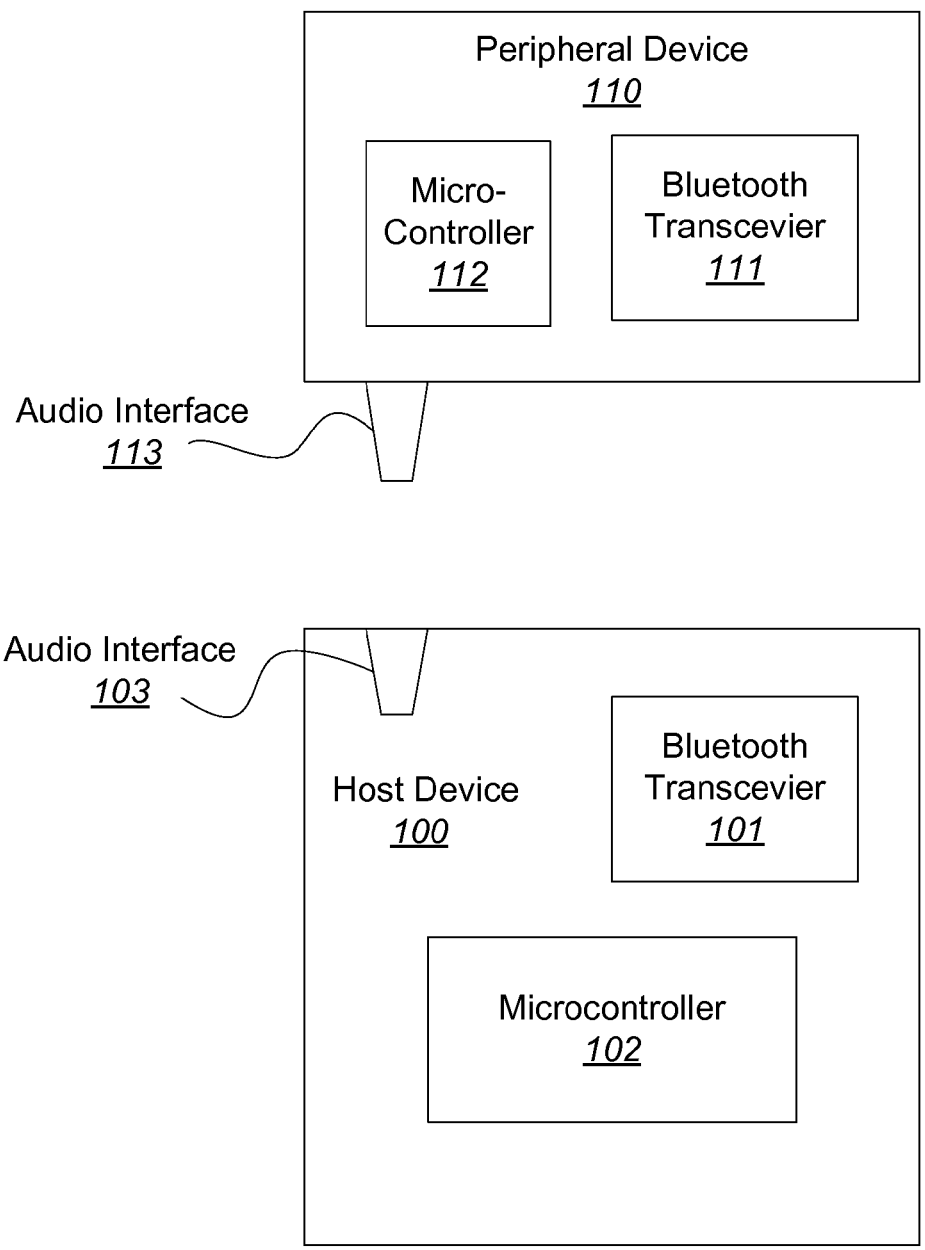
FIG. 1 shows the host device and the peripheral device and both devices are equipped with a Bluetooth transceiver and an audio interface.

The present invention describes a system and the method for pairing between Bluetooth devices using an out-of-band (OOB) audio channel in a simple and secure manner.

The system in the invention includes a host device and a peripheral device where both are equipped with an audio interface and a Bluetooth transceiver. Initially, the host device and the peripheral devices are not paired up yet. The Bluetooth transceivers on both the host device and the peripheral device can be kept in an OFF state to reduce power and radiation. When the host device and the peripheral device want to pair up for communication through the wireless Bluetooth link, they are connected together through the audio interface. Authentication data and other control information necessary for the Bluetooth pairing up are exchanged through the audio interface. When the pairing data are ready, the Bluetooth transceivers on both sides are turned on and initialized with the pairing data to establish an authenticated and cryptographically protected data communication channel.

FIG. 1 shows the host device 100 and the peripheral device 110. The host device 100 includes a Bluetooth transceiver 101, an audio interface 103, and a microcontroller 102. The microcontroller 102 is responsible for data processing and control among other components within the device 100. The peripheral device 110 includes a Bluetooth transceiver 111, an audio interface 113, and a microcontroller 112. The microcontroller 112 is responsible for data processing and control among other components within the device 110.

The peripheral device 110 is configured to be plugged into the host device 100 and communication occurs over the audio interfaces 113 and 103, respectively, in a wired connection. The peripheral device 110 is also capable of communicating with the host device 100 through a Bluetooth wireless connection. Before the Bluetooth communication can occur, a pairing operation must occur between the two devices where authentication data are exchanged to mutually authenticate one another and establish a common link key to protect the connection cryptographically.

There are two different methods for the pairing: Legacy Pairing and Secure Simple Pairing (SSP). Legacy Pairing, as its name implies, is an older method used in the Bluetooth Core Specifications before version v2.1. In this method, the authentication key is generated by a shared secret PIN code of 1 to 16 bytes in length. The Legacy Pairing method is now considered weak and many devices are using weak PIN codes. For example, many hands-free devices use 0000 or 1234 as the PIN code. Secure Simple Pairing (SSP) is a new pairing method introduced in Bluetooth Core Specifications v2.1 to improve the Legacy Pairing method. SSP is mandatory for any device that implements v2.1 or greater but Legacy Pairing is also required for compatibility reasons. There are four pairing models in SSP depending on the input/output capabilities of the host and peripheral devices: Just Works, Numeric Comparison, Passkey Entry and Out-Of-Band (OOB). In the present invention the method for pairing may be the Legacy Pairing method used before the Bluetooth Core Specifications v2.1 or the Secure Simple Pairing method defined in Bluetooth Core Specifications v2.1.

FIG. 2 shows an exemplary operation flow where the devices 100 and 110 are paired up. Initially, both the host and the peripheral devices can have their Bluetooth transceivers turned OFF to reduce power consumption (201). The peripheral device 110 can be in a sleep mode. When the peripheral device 110 is plugged into the host device through the audio interface (202), the host device 100 detects the presence of the peripheral device (203). Then the host device 100 can turn on the peripheral device 110 to wake it up through the audio interface by a command in the form of frequency tone or data packet. Alternatively, the peripheral device 110 can wake itself up by detecting the presence of the host device 100, for example, by the presence of a signal in the audio channel such as a frequency tone or a DC bias voltage level (204). Authentication information and other side information are exchanged through the audio interface (205). The information includes Device ID or Bluetooth Device Address, PIN code or Simple Pairing Hash C and Simple Pairing Randomizer R. After this pairing data exchange, the host device 100 and the peripheral device 110 both turn on their Bluetooth transceivers and are initialized with the pairing data (206). The Bluetooth transceivers 101 and 111 then establish the Bluetooth connection by a pairing protocol such as Legacy Paring or Secure Simple Pairing (207). After establishing the data channel, data communication between the two devices can be done through their Bluetooth connection.

Several embodiments of the present invention have been described. Nevertheless, it will be understood that various modifications may be made without departing from the spirit and scope of the invention. Accordingly, other embodiments are within the scope of the following claims.

What is claimed is:

1. A system of securely paired Bluetooth devices comprising:
    a host device comprising an audio interface and a Bluetooth transceiver;
    a peripheral device comprising an audio interface and a Bluetooth transceiver;
    wherein the Bluetooth transceiver of the host device and the Bluetooth transceiver of the peripheral device are in an idle power state when the host device and the peripheral device are not securely paired;
    wherein the host device and the peripheral device are configured to connect to each other by physically connecting their corresponding audio interfaces and to communicate with each other by establishing an out-of-band audio communication channel through the connected audio interfaces;
    wherein the host device and the peripheral device are configured to exchange Bluetooth authentication data via the out-of-band audio communication channel; and
    wherein the host device and the peripheral device are configured to be securely paired with each other by establishing an authenticated and cryptographically protected in-band Bluetooth communication channel with each other and wherein the in-band Bluetooth communication channel is established by the Bluetooth transceiver in the host device and the Bluetooth transceiver in the peripheral device transitioning from the idle power state to an operating state, and initializing the corresponding Bluetooth transceivers with the corresponding exchanged Bluetooth authentication data.

2. The system of claim 1, wherein the in-band Bluetooth communication channel between the host device and the peripheral device is established automatically upon detection of the presence of the host device by the peripheral device and vice versa.

3. The system of claim 1, wherein the Bluetooth authentication data comprise one of authentication code, PIN code, "Bluetooth Device Address", "Simple Pairing Hash C" or "Simple Pairing Randomizer R".

4. The system of claim 1, wherein communications between the host device and the peripheral device via the out-of-band audio communication channel are two-way communications and use modulations comprising one of Manchester coding, Frequency Shifted Keying (FSK), or Phase-Shifted Keying (PSK).

5. The system of claim 1, wherein the turning on or off of the Bluetooth transceivers is controlled through the out-of-band audio communication channel to reduce power consumption and radiation by the Bluetooth transceivers.

6. The system of claim 1, wherein the host device is paired with the peripheral device using Bluetooth pairing protocols comprising one of Legacy Pairing, Secure Simple Pairing (SSP), or Out-of-Band (OOB) Pairing.

7. The system of claim 1 wherein the host and peripheral devices comprise computing devices and the computing devices comprise one of desktop computers, mobile phones, personal digital assistants (PDAs), netbooks, tablet computers, notebook computers, electronic readers, digital music players, digital video players, game consoles, or computing circuits.

8. The system of claim 1, wherein the peripheral device is initially in a sleep mode and wherein the host device is configured to wake up the peripheral device by sending a command via the out-of-band audio communication channel.

9. The system of claim 8, wherein the command comprises frequency tone or data packet.

10. The system of claim 1, wherein the peripheral device is initially in a sleep mode and wherein the peripheral device is configured to wake itself up by detecting the presence of the host device.

11. A method for securely pairing Bluetooth devices comprising:
    providing a host device comprising an audio interface and a Bluetooth transceiver, the Bluetooth transceiver of the host device initially being in an idle state;
    providing a peripheral device comprising an audio interface and a Bluetooth transceiver, the Bluetooth transceiver of the peripheral device initially being in an idle state;
    connecting the host device and the peripheral device to each other by physically connecting their corresponding audio interfaces;
    communicating between the host device and the peripheral device by establishing an out-of-band audio communication channel through the connected audio interfaces;
    exchanging Bluetooth authentication data between the host device and the peripheral device via the out-of-band audio communication channel; and
    pairing the host device and the peripheral device with each other by establishing an authenticated and cryptographically protected in-band Bluetooth communication channel with each other and wherein the in-band Bluetooth communication channel is established by the Bluetooth transceiver in the host device and the Bluetooth transceiver in the peripheral device transitioning from the idle power state to an operating state, and initializing the corresponding Bluetooth transceivers with the corresponding exchanged Bluetooth authentication data.

12. The method of claim 11, wherein the in-band Bluetooth communication channel between the host device and the peripheral device is established automatically upon detection of the presence of the host device by the peripheral device and vice versa.

13. The method of claim 11, wherein the Bluetooth authentication data comprise one of authentication code, PIN code, "Bluetooth Device Address", "Simple Pairing Hash C" or "Simple Pairing Randomizer R".

14. The method of claim 11, wherein communications between the host device and the peripheral device via the out-of-band audio communication channel are two-way communications and use modulations comprising one of Manchester coding, Frequency Shifted Keying (FSK), or Phase-Shifted Keying (PSK).

15. The method of claim 11, wherein the turning on or off of the Bluetooth transceivers is controlled through the out-of-band audio communication channel to reduce power consumption and radiation by the Bluetooth transceivers.

16. The method of claim 11, wherein the host device is paired with the peripheral device using Bluetooth pairing protocols comprising one of Legacy Pairing, Secure Simple Pairing (SSP), or Out-of-Band (OOB) Pairing.

17. The method of claim 11, wherein the host and peripheral devices comprise computing devices and the computing devices comprise one of desktop computers, mobile phones, personal digital assistants (PDAs), netbooks, tablet computers, notebook computers, electronic readers, digital music players, digital video players, game consoles, or computing circuits.

18. The method of claim 11, wherein the peripheral device is initially in a sleep mode and wherein the host device is configured to wake up the peripheral device by sending a command via the out-of-band audio communication channel.

19. The method of claim 18, wherein the command comprises frequency tone or data packet.

20. The method of claim 11, wherein the peripheral device is initially in a sleep mode and wherein the peripheral device is configured to wake itself up by detecting the presence of the host device.

* * * * *